United States Patent [19]

Williams

[11] Patent Number: 4,778,061

[45] Date of Patent: Oct. 18, 1988

[54] AIR CLASSIFIER APPARATUS

[75] Inventor: Robert M. Williams, Ladue, Mo.

[73] Assignee: Williams Patent Crusher and Pulverizer Company, St. Louis, Mo.

[21] Appl. No.: 61,485

[22] Filed: Jun. 15, 1987

[51] Int. Cl.⁴ .......................... B07B 9/00; B07C 5/00
[52] U.S. Cl. .................... 209/44.2; 209/137; 209/147; 209/154; 209/552; 209/631; 209/672; 209/930
[58] Field of Search ........................ 209/30, 31, 34, 35, 209/37, 44.2, 136, 137, 146, 147, 154, 380, 552, 629, 631, 632, 638, 639, 644, 671, 672, 930, 932

[56] References Cited

U.S. PATENT DOCUMENTS

| 985,844 | 3/1911 | San | 209/632 X |
|---|---|---|---|
| 1,899,292 | 2/1933 | Rienks | 209/632 |
| 1,962,668 | 6/1934 | Olney | 209/136 |
| 3,044,619 | 7/1962 | Knolle | 209/147 X |
| 3,738,483 | 6/1973 | MacKenzie | 209/137 X |
| 3,986,949 | 10/1976 | DiDuca et al. | 209/35 |
| 4,089,422 | 5/1978 | Harpike et al. | 209/137 |
| 4,405,451 | 9/1983 | Roman | 209/136 |

FOREIGN PATENT DOCUMENTS 0349044 11/1929 United Kingdom ................ 209/137

Primary Examiner—Robert B. Reeves
Assistant Examiner—Edward M. Wacyra
Attorney, Agent, or Firm—Gravely, Lieder & Woodruff

[57] ABSTRACT

Waste material classifying apparatus for applying forced air streams to the waste material discharged off the end of a rotary disc screen conveyor, directing the forced air streams into an enclosure at the discharge end of the conveyor, and forming separate passages in the enclosure so that the waste material fractions are classified by the response of the fractions to the forced air or lack of response to forced air streams, whereby the forced air streams tumble and flip the waste material for augmenting the separation of the fractions.

8 Claims, 1 Drawing Sheet

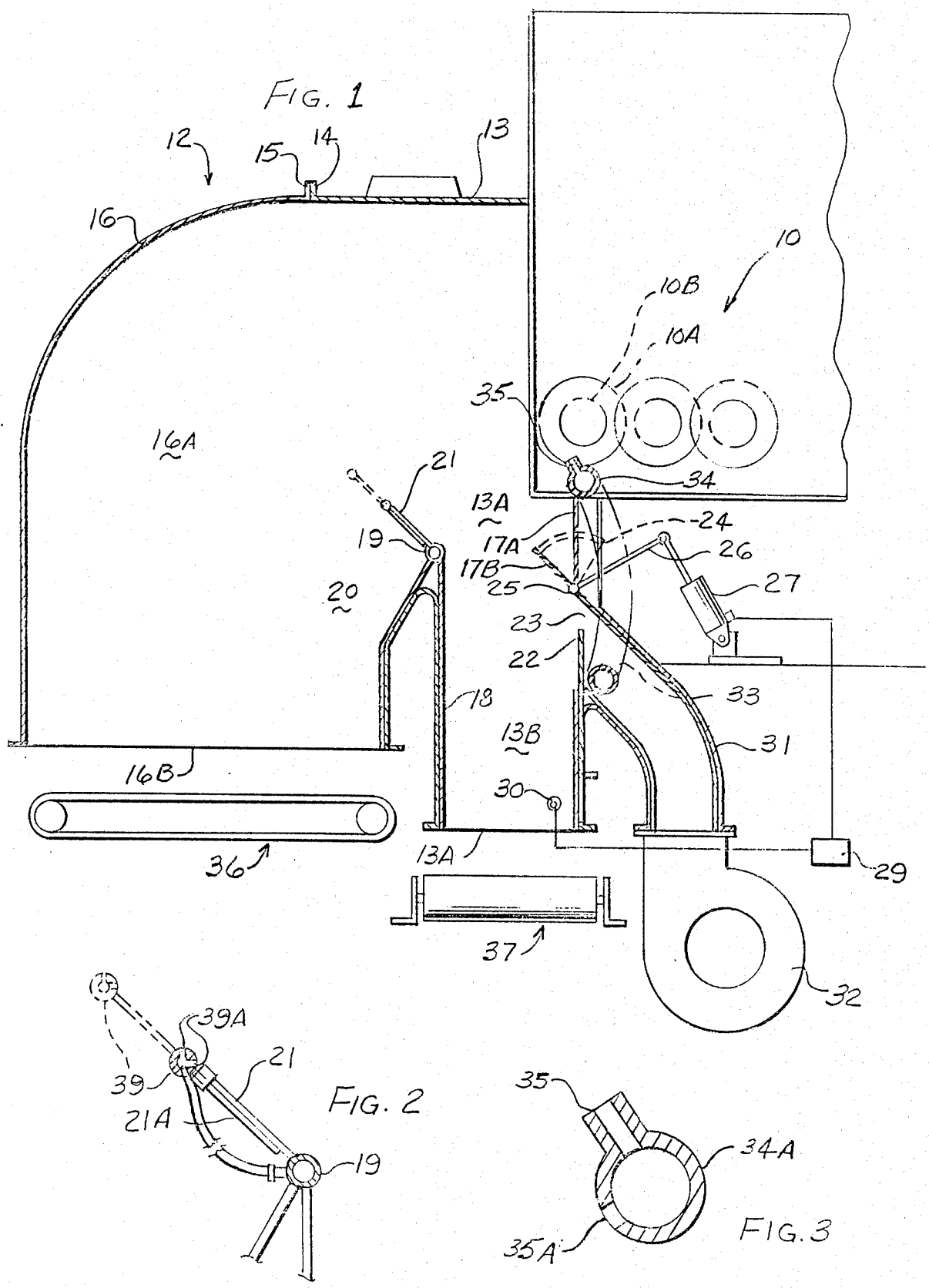

AIR CLASSIFIER APPARATUS

BACKGROUND OF THE INVENTION

1. Field of the Invention

This invention is related to apparatus for utilizing controlled air flow for classifying the material delivered off the discharge of a rotary disc screen conveyor.

2. Description of the Prior Art

It is known that material fed onto a rotary screen conveyor may consist of a highly varied assortment of waste, trash and the like which has a varied specific gravity. The rotary screen usually employs a system of rotating discs which define openings between discs so that the heavier fractions in the trash or waste are able to migrate to the openings for collection under the screen disc while the rotation of the discs conveys the remainder of material. However, the remainder of the waste and trash that continues to be delivered off the end of the screen is a residual assortment of fractions that are especially difficult to efficiently sort out and economically classify. There is the problem with those residual fractions as to what can be recycled and what can be used as a fuel for example. An example of a rotary disc screen conveyor is found in my prior U.S. Pat. No. 4,658,964 of Apr. 21, 1987. Other prior patents of interest for classifying material are U.S. Pat. No. 4,337,900 of July 6, 1982 and U.S. Pat. No. 4,339,085 of July 13, 1982.

BRIEF SUMMARY OF THE INVENTION

The air classifier apparatus is an assembly mounted at the discharge end of a rotary disc screen comprising a housing defining a space into which the discharging material is sorted into separate passages according to certain classes of waste and trash material which are caused to move under the influence of material sorting air knives for influencing the course of travel of the waste in accordance with the action of the air knives. A primary air flow at a predetermined velocity and volume is provided adjacent the end of the rotary disc screen conveyor and a secondary air flow is introduced into the housing structure having separate passages adapted to receive the air and direct it in predetermined directions to meet the material delivered off the end of the rotary disc screen and effect its classification according to the specific gravity characteristic and responsiveness to the way the air flow is directed or forced into the discharging waste material.

The broad object of the present invention is to provide forced air classifying means to clear waste and trash off the discharge end of a rotary disc screen or similar type of conveyance for such material and to provide secondary forced air for rapidly classifying the material according to its specific gravity characteristics and responsiveness to the forced air flow.

The objects of the present invention to be described herein are exemplified by apparatus which classifies material according to specific gravity characteristics and provides receiving flow paths to influence the separating out of the various classes of material.

BRIEF DESCRIPTION OF THE DRAWINGS

A presently preferred embodiment of the air classifying apparatus is disclosed in the following views, wherein:

FIG. 1 is a schematic side elevation showing in section the arrangement of the housing to be associated with the discharge end of a rotary disc screen conveyor that is shown in phantom outline at the entrance to the housing;

FIG. 2 is an enlarged detail view of a portion of the schematic view of FIG. 1 to better present the control over certain of the movable components seen in FIG. 1;

FIG. 3 is a fragmentary sectional detail of a modified forced air flow provision for the present apparatus.

DETAILED DESCRIPTION OF THE INVENTION

A preferred embodiment of the invention is seen in FIG. 1 where the discharge end portion of a rotary disc screen conveyor 10 is disclosed in phantom outline. That end portion is aligned with the inlet 11 of a structure forming an enclosure 12 for receiving the material discharged from the end of the conveyor 10. The size and capacity of the enclosure 12 is selected to suit the type of waste material that is expected to reach the discharge end. That enclosure 12 comprises a section 13 at the end of conveyor 10 formed with a flange 14 which mates with a similar flange 15 formed on an enlarged section 16 of the enclosure defining a passage 16A. The section 13 provides an inlet 13A for a passage 13B aligned laterally below the discharge end of conveyor IO and is defined by a wall 17 and a partition 18 which are shown in section. The passage 13B between the partition 1B and wall 17 opens upwardly at the conveyor discharge end, and the partition 18 supports at its upper end a horizontally directed pipe 19 which extends between the vertical side walls 20 (one being seen in FIG. 1) so that a compressed fluid (such as air) can be supplied to it. The pipe supports a slide board 21 which uses the pipe as a fulcrum so the board may be pivoted to a desired position for a purpose to appear.

The wall 17 for the passage 13B carries an adjustable baffle 22 which can be slidably positioned to increase or decrease the forced air inlet port 23. The upper portion of the passage 13B is defined by a fixed wall 17A and a sector-type damper 24 is pivotally supported by a shaft 25 carried by the fixed wall 17A. The damper has a curved wall and a flat front wall 17B presented to the passage 13B. The damper 24 is adjusted in position by a suitable crank 26 and fluid pressure motor means 27 so that the front wall 17B may be moved to increase or decrease the opening 13A of the passage 13B between the fixed wall 17A and the top of the partition 18.

The enclosure 12 includes an enlarged section 16 which defines a large capacity passage 16A for waste material with a downwardly opening discharge outlet 16B. That outlet 16B is partly defined by the partition 18, and a slide board 21 at the upper end of the partition 18 projects angularly into the path 16A at a position spaced from the discharge end of the conveyor 10.

A controller 29 is employed for the motor means 27, subject to a pressure responsive transducer element 30 in the passage 13B. That element 30 is sensitive to a predetermined increase in the pressure in the passage 13B generated by the forced air flow admitted to the passage 13B from a conduit 31 connected to the outlet of a blower 32. The air flowing in conduit 31 enters the passage at opening 23, and the size of that opening is adjusted by the movable baffle 22. That baffle 22 serves two functions. One function is to impose a back pressure in conduit 31 so air can be bled off at conduit 33 and delivered to a primary forced air flow in manifold 34 having nozzle-like outlets 35 spaced along its length and aligned with the spaces between the disc elements 10A of the rotary disc screen conveyor 10. That function is to direct blasts of primary air between the screen discs 10A to keep the discharge end of the conveyor clear of waste material wrapping around the disc shaft 10B and effecting an air blast which initiates a tumbling action on the waste material as it falls or is forced off the conveyor end.

The second function of the baffle 22 is to cooperate with the damper 24 in creating a condition at the top of the passage 13B that will direct a secondary forced air flow passing through the opening 23 into the upper area or volume of the enclosure section 13 to augment the tumbling action in the waste material and assist in freeing heavy fractions of waste that may be tangled up with lighter fractions. Thus, the heavy fractions will drop into the passage 13B. There is a further cooperative function of the baffle 22 and damper 24. If the waste material bridges over between the damper 24 and the top of the partition 18 the air from the blower 32 will be deflected toward the outlet 13A and cause an increase in the pressure which is sensed by the transducer element 30 to register a pressure increase. That reponse at element 30 will operate the controller 29 to energize motor means 27 in a direction to pivot the damper 24 to open up the space between damper 24 and the partition 17 and thus cause any waste material bridging the inlet to collapse and restore the intended classifying action of the air on the material coming off the conveyor 10.

The detail seen in FIG. 3 is a modified manifold 34A having the before noted nozzle-like outlets 35. The modification includes lateral forced air outlets 35A spaced along the length of the manifold 34A and angularly directed to direct flow of air into the area of the inlet 13A to passage 13B so that waste material which might block that inlet 13A can be broken up or prevented from forming in the first instance.

Additionally, the slide board 21 is positioned to direct the heavier fractions into the passage 13B. Also, the slide board 21 supports a horizontal pipe 39 which is formed with a series of spaced orifices 39A (see FIG. 2) which are effective to direct air streams into the tumbling waste fractions and further induce the heavier fractions to fall into the passage 13B, thereby improving the classifying function of the device. The mounting board 21 supported by the pipe 19 carries a slidable element 21A which carries the pipe 39 having forced air outlet ports 39A. The element 21A may be slid outwardly on the board 21 to locate the head pipe 39 as desired. The outlet ports receive air through a flexible hose 39 to accommodate the position adjustment of the head pipe 39, and ports 39A are intended to prevent air responsive waste material from draping over the board 21 and the pipe 39. Forced air supply can be obtained from a suitable connecting hose open to the passage 31.

Thus the light weight fractions will fall onto a suitable conveyor 36 and be moved away from the heavier fractions which are collected on a separate conveyor 37.

In summary, the apparatus for receiving and classifying the waste material discharged off the end of the rotary disc conveyor 10 is constructed to provide a primary forced flow of air at its discharge end and a secondary flow of air in a first passage 13A directed laterally below the discharge end of the conveyor to receive the heavy fractions of the waste material that lacks response to the forced air flow that enters the first passage 13A and is directed upwardly through the inlet of that first passage and assists in tumbling the waste material so that the heavy fractions are separated and fall through the inlet of that first passage. Concurrently, the fractions of the waste material that are responsive to the forced air flow are tumbled and flipped about before moving into a second and larger passage 16A that is adjacent the first passage. The partition 18 is located to separate the first and second passages, and that partition supports a fluid flow conduit 19 which, in turn, supports a slide board 21 positioned to divert or direct the waste material that is generally unresponsive to the forced air flow into the passage 13A. The slide board 21 carries a supplemented forced air head pipe 39 connected to the pipe 19 so that air is supplied to the nozzles 39A which are oriented to direct air in a direction to prevent waste material draping over the head pipe 39. A flexible hose is connected between the forced air conduit 31 and the pipe 19 as will be understood, but has not been disclosed to avoid difficulty in the view of FIG. 1.

The controller 29 operates the damper 24 to remove its support from waste material that may bridge over and block the inlet area 13A to passage 13B. This function may be sufficient, but in the event it is not immediately effective, the controller 29 will cycle the damper 24 several times and should that be ineffective an alarm will be sounded so an attendant can be alerted to clear the blockage material.

What is claimed is:

1. In air classifier apparatus for separating out from a flow of waste material a fraction that is responsive to air flow and a fraction that is non-responsive to air flow, and waste material conveying means having a waste material discharge end that creates the flow of waste material, the improvement comprising:
   (a) a waste material and air flow enclosure having a waste material receiving inlet opening aligned with the waste material conveying means discharge end, and partition means in said enclosure to separate a portion of the enclosure space into a first passage having an inlet opening for the reception of waste material fractions non-responsive to air flow and a space forming a second passage for the reception of air responsive waste material fractions;
   (b) means for generating forced air flow; and
   (c) forced air flow directing means connected to said forced air flow generating means and associated with said first passage, said directing means including primary forced air flow means positioned to deliver a flow of forced air across the path of movement of the waste material at the discharge end of the waste material conveying means and into said enclosure waste material inlet opening for clearing waste material from the discharge end of the conveying means and initiating a first stage in the classification of the waste material entering said enclosure, and secondary forced air flow means supported on said partition means and communicating with said second passage in said waste material enclosure and spaced from the inlet opening thereof for delivering forced air flow into the waste material as it moves into said enclosure for augmenting said waste material classification, whereby said waste material fraction that is non-responsive to forced air flow is effectively separated from the air responsive waste material fraction and is further separated out and directed into the first passage of said enclosure defined by said partition means.

2. The improvement set forth in claim 1 wherein said secondary forced air flow means effects the tumbling of waste material in its flow toward said first passage to again further tumble the waste material that is initially responsive to said primary forced air flow through said inlet opening.

3. The improvement set forth in claim 1 wherein adjustable means is operatively positioned adjacent said inlet opening of said first passage to form with said partition an inlet for waste material non-responsive to air flow, said adjustable means being operable for varying the size of said inlet opening; and control means is connected to operate said adjustable means for varying the size of said inlet.

4. The improvement set forth in claim 3 wherein pressure responsive means is positioned in said first passage; and control means responsive to said pressure responsive means is connected to said inlet opening size varying adjustable means, whereby upon blockage of said inlet opening by waste material lacking responsive to forced air flow said pressure responsive means senses an increase in the pressure in said first passage and causes said control means to operate said inlet size varying adjustable means to increase the inlet size opening for dislodging the blockage of said inlet opening.

5. The improvement set forth in claim 1 wherein diverter means is mounted on said partition means in position to intercept and divert waste material lacking response to said primary forced air flow into said first passage inlet opening; and said secondary forced air flow directing means augments the tumbling of the waste material responsive to said primary forced air flow, and for continuing the classifying of the waste material in accordance with response or lack of response to forced air flow.

6. In apparatus for receiving waste material from the discharge end of a rotary disc screen conveyor and for classifying that waste material in accordance with its responsiveness to forced air flow, the improvement comprising:

(a) an enclosure positioned adjacent the discharge end of the rotary disc screen conveyor and defining separate waste material outlets;

(b) air flow controlling means associated with said enclosure for initiating separation of waste material into fractions responsive to air flow and other fractions;

(c) partition means in said enclosure located to define a first path for said other fractions and a second path for air responsive fractions;

(d) forced air flow means carried by said partition means in position to clear the tendency of said air responsive fractions to hang on said partition means; and (e) a source of forced air flow communicating with the rotary disc screen conveyor discharge end and with said enclosure for effecting the clearance of waste material from the discharge end and the tumbling of the waste material expelled from the conveyor discharge end, whereby the air responsive fractions and the other fractions pass through said separate waste material outlets respectively.

7. A waste meterial classifier apparatus in combination with a rotary disc screen conveyor having a waste material outlet, said apparatus comprising:

(a) an enclosure structure having an inlet opening mating with the rotary disc screen conveyor outlet;

(b) partition means extending into and dividing said enclosure structure into first and second passages, one of said passages having an inlet laterally adjacent said enclosure inlet opening and the other of said passages being spaced from said one passage;

(c) a source of air under pressure having a conduit connected into said one passage, and baffle means operative at said connection for effecting a back pressure in said one passage;

(d) means connected into said conduit for directing a portion of the air under pressure across the waste material outlet of the rotary disc screen for maintaining that outlet clear of waste material; and (e) means carried by said partition means for delivering an auxiliary flow of air into the waste material for inducing heavy fractions of waste material to move into said one passage, and air flow responsive fractions of waste material to move into said other of said passages.

8. The apparatus set forth in claim 7 wherein said one of said passages of said enclosure carries a movable damper having a surface positionable in said one of said passagaes for varying the cross section of said one passage inlet such that waste material from said rotary screen outlet will clear the inlet of said one passage; and control means connected to said movable damper and having pressure responsive means in said one passage for responding to increases in the back pressure in said one passage whereby said movable damper is controlled in response to the back pressure within said one passage.

* * * * *

UNITED STATES PATENT AND TRADEMARK OFFICE
CERTIFICATE OF CORRECTION

PATENT NO. : 4,778,061

DATED : October 18, 1988

INVENTOR(S) : Robert M. Williams

It is certified that error appears in the above-identified patent and that said Letters Patent is hereby corrected as shown below:

Column 5, line 22, Claim 4 "responsive" should be "response".

Column 6, line 43, Claim 8 "passagaes" should be "passages".

Signed and Sealed this

Twenty-second Day of August, 1989

Attest:

DONALD J. QUIGG

Attesting Officer

Commissioner of Patents and Trademarks